(12) United States Patent
Capitina

(10) Patent No.: US 9,238,445 B2
(45) Date of Patent: Jan. 19, 2016

(54) EXPANDABLE VEHICLE DOOR GUARD

(71) Applicant: Franco Capitina, Kirkland (CA)

(72) Inventor: Franco Capitina, Kirkland (CA)

(*) Notice: Subject to any disclaimer, the term of this patent is extended or adjusted under 35 U.S.C. 154(b) by 0 days.

(21) Appl. No.: 14/305,938

(22) Filed: Jun. 16, 2014

(65) Prior Publication Data

US 2014/0367983 A1    Dec. 18, 2014

Related U.S. Application Data

(60) Provisional application No. 61/835,220, filed on Jun. 14, 2013.

(51) Int. Cl.
| | |
|---|---|
| *B60R 19/42* | (2006.01) |
| *B60R 19/38* | (2006.01) |
| *B60R 19/14* | (2006.01) |
| *B60R 13/04* | (2006.01) |

(52) U.S. Cl.
CPC .............. *B60R 19/42* (2013.01); *B60R 13/04* (2013.01); *B60R 19/14* (2013.01); *B60R 19/38* (2013.01); *B60R 13/043* (2013.01)

(58) Field of Classification Search
CPC ......... B60J 5/0493; B60J 11/06; B60R 13/04; B60R 13/043; B60R 19/02; B60R 19/04; B60R 19/14; B60R 19/38; B60R 19/42

USPC ............. 293/9, 21, 118, 123, 126, 128; 296/146.5, 152

See application file for complete search history.

(56) References Cited

U.S. PATENT DOCUMENTS

| | | | |
|---|---|---|---|
| 3,309,129 A | 3/1967 | Harry | |
| 3,718,357 A * | 2/1973 | Hertzell | ............. 293/9 |
| 4,221,412 A * | 9/1980 | Miller | ............ 293/118 |
| 4,398,758 A | 8/1983 | Tabares | |
| 4,904,016 A | 2/1990 | Tatsumi | |
| 5,004,281 A * | 4/1991 | Yamazaki | ............ 293/118 |
| 5,037,148 A | 8/1991 | Kennedy | |
| 8,292,350 B2 | 10/2012 | Li | |

FOREIGN PATENT DOCUMENTS

DE    10321293 A1 * 12/2004

* cited by examiner

*Primary Examiner* — Jason S Daniels
(74) *Attorney, Agent, or Firm* — Daniel Boudwin, Esq; Global Intellectual Property Agency, LLC

(57) ABSTRACT

A door guard that is adapted to extend and retract as desired by the user is provided. The present door guard comprises a motor disposed within the interior portion of an automotive vehicle side door and an expandable guard assembly disposed on the exterior portion of an vehicle door. The motor is connected to a control unit, which allows the user to vertically expand and retract the guard assembly as desired.

20 Claims, 4 Drawing Sheets

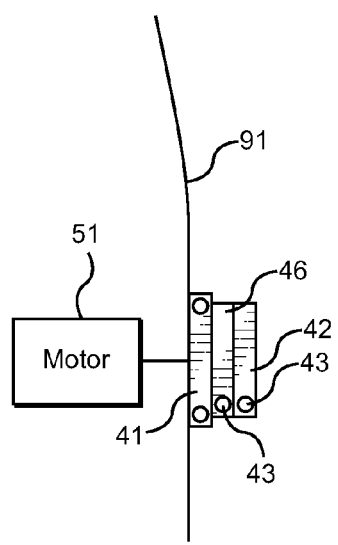
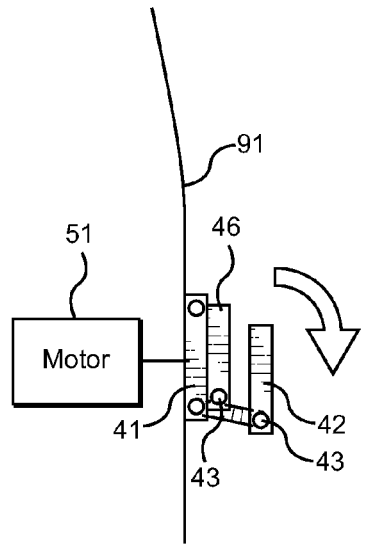
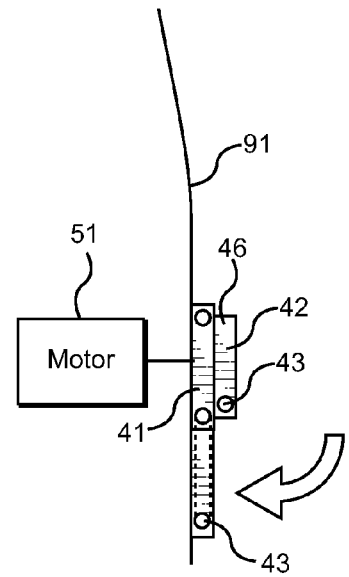
FIG.3A  FIG.3B  FIG.3C
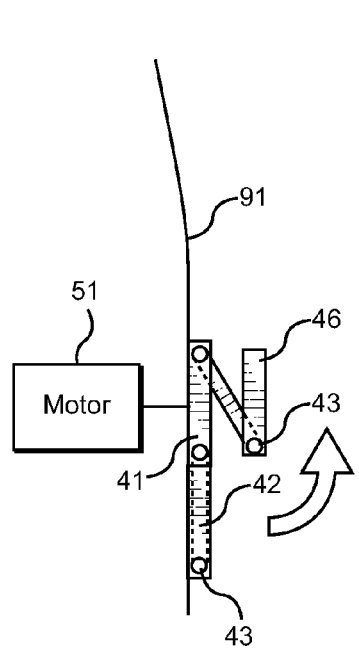
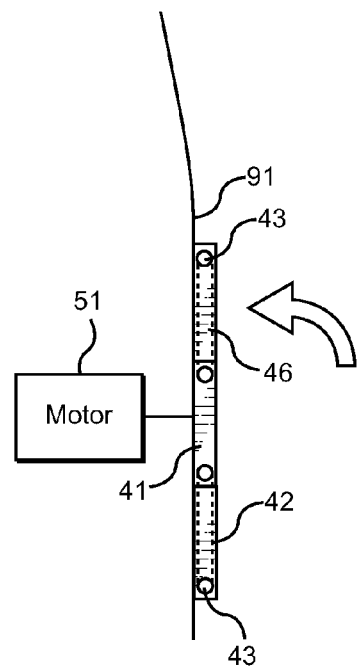
FIG.3D  FIG.3E

EXPANDABLE VEHICLE DOOR GUARD

CROSS REFERENCE TO RELATED APPLICATION

This application claims the benefit of U.S. Provisional Application No. 61/835,220 filed on Jun. 14, 2013. The above identified patent application is herein incorporated by reference in its entirety to provide continuity of disclosure.

BACKGROUND OF THE INVENTION

Field of the Invention

The present invention relates to vehicle door guards or molding. More specifically, the present invention relates to door guards that are adapted to transition between a compact configuration and an expanded configuration that provides increased protection to a vehicle's door.

Vehicle doors are exposed to a wide variety of threats that can cause dings, dents, scratches, and other such damage, especially in highly congested and busy areas such as parking lots. These threats include car doors from adjacently parked vehicles, shopping carts, and such. If individuals do not protect their car door from these threats, they may have to either live with the unattractive appearance of the exterior of their vehicle or pay for expensive dent or scratch repairs. Neither option is desirable, therefore many individuals choose to protect the investment that is their vehicle and utilize some type of means for protecting their car doors and the exterior of their car from such threats.

Conventional vehicle side door guards comprise molding pieces that are either permanently or removably attached to the exterior of the vehicle's door and extend therefrom. These conventional door guards protrude from the surface of the vehicle door, stopping objects short and preventing them from coming in contact with the vehicle's door. Conventional door guards are generally adapted to only protect an vehicle's side doors from adjoining vehicles; however, all sorts of objects that are not at the height of a vehicle's door guard or door molding are capable of coming in contact with a vehicle's exterior side and causing damage thereto. Installing a door guard device that covered the entire exterior surface of a car door is also not desirable, however, because it would negatively impact the appearance of the car by completely hiding the car door. Therefore, there is a need in the prior art for a device that is adapted to protect an vehicle door's exterior surface from all manner of objects that can cause dings, dents, and scratches, without negatively impacting the overall appearance of the vehicle when it is being driven.

The present invention provides an extendable door guard that is adapted to transition between an extended configuration that is adapted to protect the entire exterior surface of an vehicle side door and a compact configuration that does not negatively impact the aesthetics of the vehicle. The present invention preferably appears to simply be molding or trim extending around the exterior of the vehicle when in its compact configuration; however, it further comprises a mechanism to vertically extend a plurality of guard members as desired by the user via a control interface. The control interface comprises a key fob-like device, an interface installed within the dashboard of the vehicle, or any other such system that can be utilized by a user to transition the door guard members between their extended and retracted configurations.

DESCRIPTION OF THE PRIOR ART

Devices have been disclosed in the prior art that relate to door guards. These include devices that have been patented and published in patent application publications. These devices generally relate to elongated members attached to the exterior surface of an vehicle door that protrude therefrom in order to prevent objects from making contact with the vehicle door. The following is a list of devices deemed most relevant to the present disclosure, which are herein described for the purposes of highlighting and differentiating the unique aspects of the present invention, and further highlighting the drawbacks existing in the prior art.

Many such devices comprise an elongated member that is affixed horizontally to the exterior surface of an vehicle door via a magnet or another such removable connection. This elongated protrudes from the body of the vehicle, preventing objects such as car doors from coming in contact with the vehicle side door exterior surface and causing dents, dings, scratches, or other such damage. These devices are only effective at guarding the vehicle side doors from objects at the height of the guard. Furthermore, some of these devices are adapted to be attached and removed as desired by the user, but they do not have electrical components and motors that allow them to transition between multiple different configurations.

Alternatively, many vehicles comprise various types of movable and pivotable systems that are adapted to transition between retracted and extended configurations, such as convertible hardtop apparatuses. However, none of these systems are specifically adapted to retract and deploy guard panels along the side of an vehicle in order to protect the vehicle from damage due to collisions from objects making hard contact with the exterior of the vehicle.

The present invention provides an extendable and retractable door guard system in order to protect the vehicle to which the present invention is affixed from dings, dents, scratches, and other damage caused by objects coming in contact with the vehicle. A first embodiment of the present invention utilizes a servomotor that is disposed within the interior portion of an vehicle door, a drive shaft extending therefrom through the door, and a system of pivotally connected guard panels that are deployed via a gear train system when the servomotor is activated. A second embodiment of the present invention comprises a plurality of stacked panels that are pivotally connected to a base member, which rests flush against the exterior surface of the vehicle door and, as with the previously discussed embodiment, is connected to a motor assembly disposed within the vehicle side door. When activated, panels pivot away from their stacked configuration, extending vertically therefrom and covering a larger surface area of the vehicle side door than when in the stacked configuration. These embodiments of the present invention are intended solely to be exemplary and are not to be viewed as limiting in any way.

The various embodiments of the present invention are adapted to be selectively deployable by a user via a control unit. The control unit comprises a key fob-like device having at least one button disposed thereon that wirelessly transmits a signal to the guard unit assembly when actuated by the user, a control interface that is disposed within the interior of the car and that has a hardwired connection to the guard unit assembly's motor, or any other such system. The present invention provides users with a convenient and effective means for protecting their vehicle from all types of potential damage to the side doors when desired, without permanently negatively affecting their vehicle's aesthetic value. The present invention substantially diverges in design elements from the prior art and consequently it is clear that there is a need in the art for an improvement to existing vehicle side door guard devices. In this regard the instant invention substantially fulfills these needs.

SUMMARY OF THE INVENTION

In view of the foregoing disadvantages inherent in the known types of vehicle door guards now present in the prior art, the present invention provides a new extendable vehicle door guard wherein the same can be utilized for providing convenience for the user when seeking to protect his or her vehicle from damage caused by low-speed collisions with objects in the environment surrounding the vehicle.

It is therefore an object of the present invention to provide a new and improved vehicle door guard device that has all of the advantages of the prior art and none of the disadvantages.

It is another object of the present invention to provide an vehicle door guard device that is adapted to transition between a protective extended position and a retracted position.

Another object of the present invention is to provide an vehicle door guard device that is adapted to protect the vehicle side door to which it is attached from low-speed collisions.

Another object of the present invention is to provide an vehicle door guard device that is retracted or deployed via a user control unit.

Yet another object of the present invention is to provide an vehicle door guard device that is actuated via a motor disposed within the interior of the vehicle side door.

Still yet another object of the present invention is to provide an vehicle door guard device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIGS. 3A-E show consecutive side views of a second embodiment of the present invention transitioning between a retracted configuration and an extended configuration.

Figure 4:
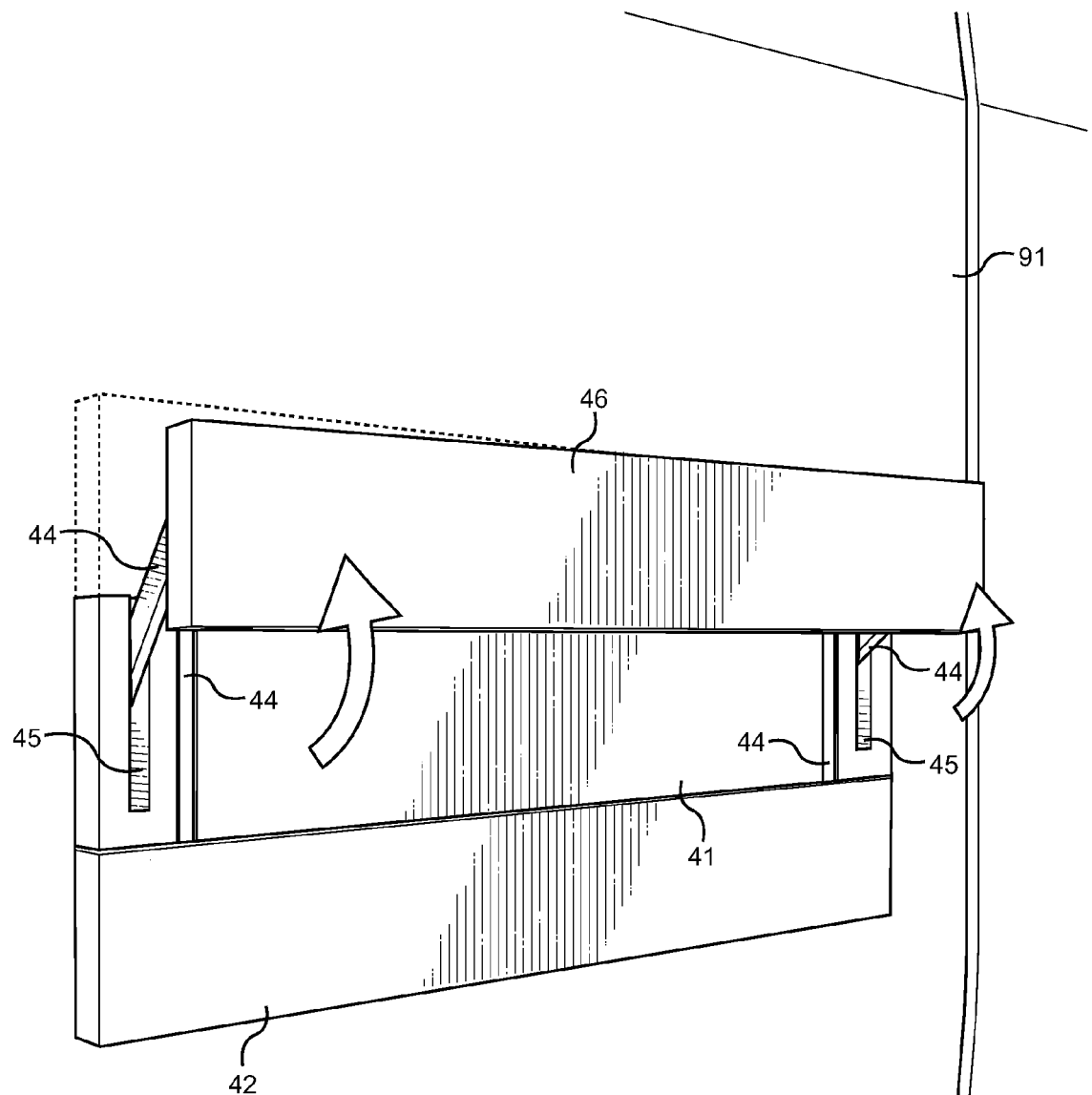

FIG. 4 shows a perspective view of a second embodiment of the present invention affixed to the exterior of a vehicle side door.

DETAILED DESCRIPTION OF THE INVENTION

Reference is made herein to the attached drawings. Like reference numerals are used throughout the drawings to depict like or similar elements of the extendable vehicle door guard. For the purposes of presenting a brief and clear description of the present invention, the preferred embodiment will be discussed as used for protecting an vehicle side door from dings, dents, scratches, and other such types of damage caused by low-speed collisions with car doors from other vehicles in close proximity to the given vehicle, shopping carts, and other such objects that commonly in contact with an vehicle in parking lots and other such locations. The figures are intended for representative purposes only and should not be considered to be limiting in any respect.

As used in the present specification, the term "vehicle" includes any car, truck, SUV, or any other such automotive vehicle known in the prior. The present invention provides a system that is permanently affixed to the exterior portion of a vehicle's door and is adapted to transition between an extended configuration and a compact retracted configuration. In the extended configuration, a plurality of pivotally connected panel members are vertically unfurled from a compact form in order increase the surface area of the door that the present invention protects. In its retracted form, the present invention preferably appears to be a conventional side door guard or trim molding extending horizontally across the middle portion of the exterior surface of an vehicle side door. The door guard assembly is driven by a motor that is disposed within the door to which the door guard assembly is attached. The motor is activated via a control unit, which may comprise a key fob-like device, a control interface disposed within the interior of the vehicle, or any other such system that is adapted to electrically or wirelessly activate a motor.

Figure 1A:
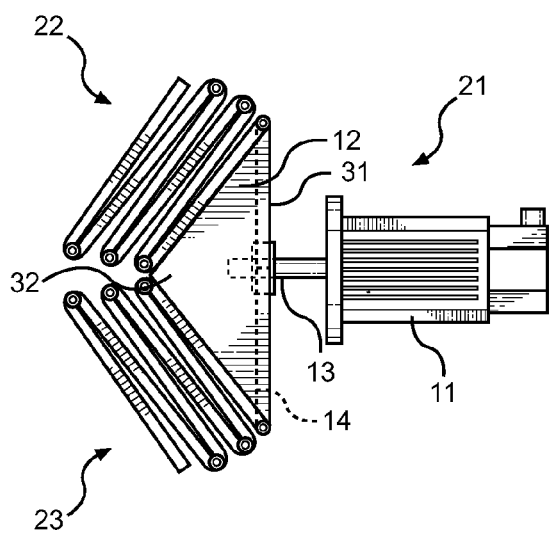
FIG. 1A shows a side view of a first embodiment of the present invention in a retracted configuration.
Figure 1B:
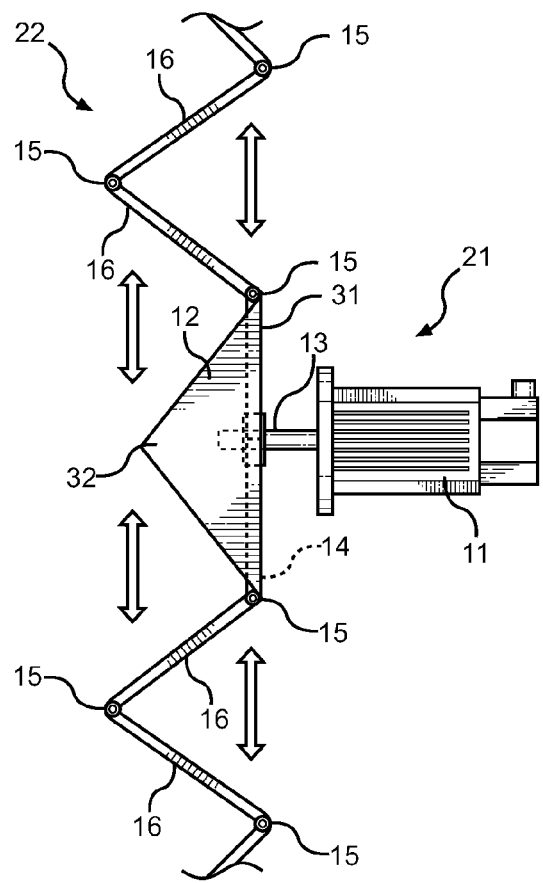
FIG. 1B shows a side view of a first embodiment of the present invention in an extended configuration.

Referring now to FIGS. 1A and 1B, there are shown side views of a first embodiment of the present invention in a retracted configuration and an extended configuration, respectively. The present invention comprises a motor 11 disposed within the interior portion of a vehicle door, a drive shaft 13 that extends therefrom through an aperture in the outer surface of the vehicle door, and a door guard assembly 21 that is connected to said drive shaft 13. The motor 11 comprises a servomotor or other type of rotary actuator that is adapted to generate rotational force. The door guard assembly 21 comprises a housing member 12 that has a plurality of guard panels 16 pivotally connected 15 thereto. The guard panels 16 are adapted to transition between a compact configuration in which the guard panels 16 rest tightly against the housing member 12 and an extended configuration wherein one set of panels 16 extend upwardly from the housing member 11 and another set of panels 16 extends downwardly therefrom, thereby providing increased coverage over the exterior surface area of the vehicle door to which the present invention is affixed.

As depicted, the housing member 12 is depicted as triangular in shape; however, no claim is made as to the precise size, shape, or design of the housing member 12. The housing member 12 and the guard panels 16 are preferably composed of durable plastic materials that are adapted to absorb impacts. The housing member 12 comprises a first side 31 that is adapted to rest flush against the exterior surface of an vehicle door and a protruding second side 32 that assists in preventing objects from coming in contact with the vehicle door. The drive shaft 13 extends from the motor 11 into the interior portion of the housing 12 where it engages with a gear train 14, which in turn is connected to the top 22 and bottom 23 sets of guard panels 16 that are pivotally connected to both each other and the housing member 12. When actuated by the drive shaft 13, the gear train 13 causes the top 22 set of guard panels 16 to extend upwardly and the bottom 23 set of guard panels 16 to extend downwardly. The gear train 14 comprises a plurality of gears that, when rotated, engage with toothed members and cause said toothed members to extend downwardly or upwardly, depending upon their positioning in relation to the gears.

When the drive shaft 13 is rotated in a first direction by the motor 11, it causes the top set 22 of guard panels 16 to extend upwardly and the bottom set 23 of guard panels 16 to extend downwardly; when the drive shaft 13 is rotated in a second direction by the motor 11, it causes the top set 22 of guard panels 16 to extend downwardly and the bottom set 23 of guard panels 16 to extend upwardly. The rotation of the motor 11 is controlled electronically via a control unit connected thereto. In one embodiment of the present invention, the control unit comprises a key fob-like device that is wirelessly connected to the motor 11, wherein users can control the deployment of the guard panel assembly 21 via pressing buttons disposed on the fob. For example, if the guard panel assembly 21 is in its retracted configuration, then pressing the button on the fob wirelessly transmits a signal to the motor 11 that then causes the assembly 21 to extend; if the guard panel assembly 21 is in its extended configuration, then pressing the button on the fob wirelessly transmits a signal to the motor 11 that then causes the assembly 21 to retract. In an alternative embodiment of the present invention, the control unit comprises a control interface that is installed within the interior of the vehicle to which the present invention is affixed, such as on the dashboard. In this embodiment, the control unit is directly connected to the motor 11 via an electrical connection that is installed integrally within the vehicle. These embodiments of the control unit of the present invention are intended to be merely exemplary and no claim is made as to a specific type or configuration of the control unit utilized by the present invention.

Figure 2:
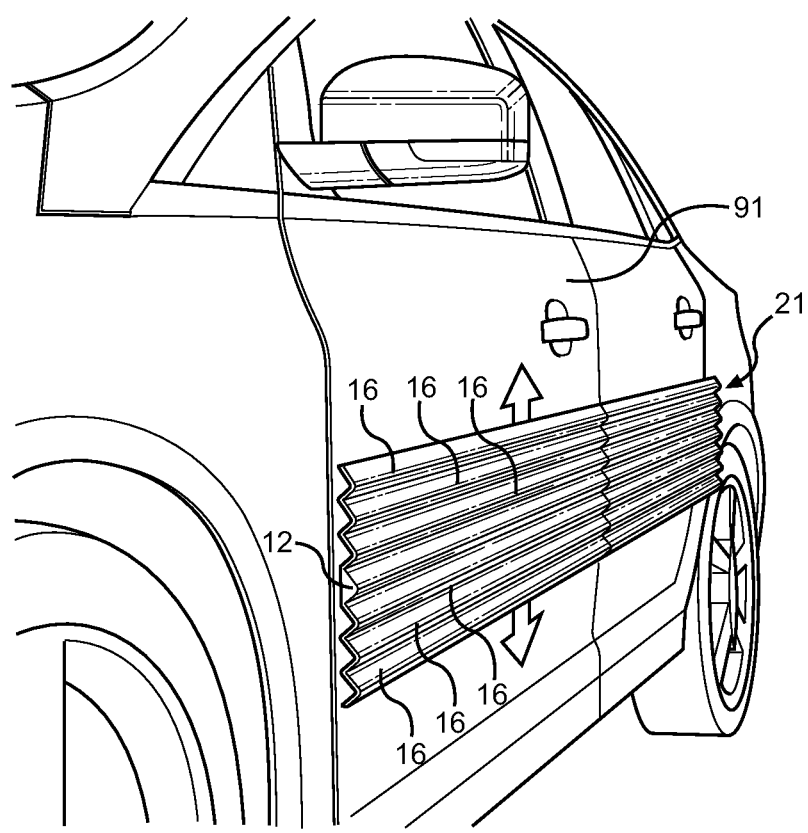
FIG. 2 shows a perspective view of a first embodiment of the present invention affixed to the exterior of a vehicle side door.

Referring now to FIG. 2, there is shown a perspective view of a first embodiment of the present invention affixed to the exterior of a vehicle side door. The guard panel assembly 21 is held flush against the vehicle door via the drive shaft. The guard panel assembly 21 comprises a housing member 12 that is located centrally on the assembly 21 when the assembly 21 is fully extended and a plurality of pivotally connected guard panels 16. The guard panels 16 are pivotally connected to the housing member 12 and to each other in series. The pivotal connections allow the guard panel assembly 21 to vertically unfurl from a compact position in which the guard panels 16 rest tightly against the housing member 12 and an extended configuration. Even when the guard panel assembly 21 is fully extended, the guard panels 16 are preferably maintained in a series of substantially triangular shapes even when the guard panel assembly 21 is fully extended. When in a triangular position, the guard panels 16 are able to absorb impacts while still maintaining a cushion or space between the exterior surface of the vehicle door 91 and the object that is coming in contact with the present invention.

Referring now to FIGS. 3A-3E, there are shown consecutive side views of a second embodiment of the present invention transitioning between a retracted configuration and an extended configuration. This embodiment of the present invention comprises a motor 51 disposed within the interior portion of an vehicle door 91, a base guard panel 41 that is affixed to the exterior surface of an vehicle door 91 and is integrally connected to the motor 51, and a plurality of deployable guard panels 42, 46 that are pivotally connected 43 to the base guard panel 41. When in the retracted configuration, the deployable guard panels 42, 46 are stacked upon the base guard panel 41 to minimize the vertical distance that the present guard panel assembly 21 extends upwardly and downwardly, as seen in FIG. 3A. The depicted embodiment of the present invention utilizes a pair of deployable guard panels 42, 46 that are pivotally extendable from the base guard panel 41. In this embodiment of the present invention, the first deployable guard panel 42 rotates away from the stacked guard panel assembly 21 first and then comes to rest flush against the exterior surface of the vehicle door 91 below the base guard panel 41, as seen in FIGS. 3B and 3C. Once the first deployable guard panel 42 is no longer obstructing the movement of the second deployable guard panel 46 situated thereunder, the second deployable guard panel 46 then rotates away from the base guard panel 41 in much the same manner, but instead pivoting upwardly, as seen in FIGS. 3D and 3E.

Referring now to FIG. 4, there is shown a perspective view of a second embodiment of the present invention affixed to the exterior of a vehicle side door. The first and second deployable guard panels 42, 46 are connected to the base guard panel 41 via arms 44 that are pivotally connected at both of their ends to the guard panels 42, 43, 46, thereby allowing the first and second deployable guard panels 42, 46 to pivot as they rotate between the compact, retracted configuration and the extended configuration. The arms 44 rest within complementary slots 45 disposed on the top surface of the base guard panel 41 and the bottom surface of the deployable guard panels 42, 46. Because the slots are adapted to rest within these slots 45, the deployable guard panels 42, 46 can come to rest on the same plane as the base guard panel 41, flush against the exterior surface of the vehicle side door 91.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle door guard, comprising:
    a motor adapted to be disposed within a vehicle door having an exterior surface, said motor comprising a drive shaft extending therefrom through said vehicle door exterior surface;
    a base panel connected to said drive shaft, wherein said base panel is adapted to be affixed to said vehicle door exterior surface;
    a plurality of deployable guard panels pivotally mounted to said base panel;
    wherein said motor is adapted to cause said plurality of deployable guard panels to transition between an extended position and a retracted position.

2. The vehicle door guard of claim 1, wherein said motor is a servomotor.

3. The vehicle door guard of claim 1, wherein said base panel is a protruding member.

4. The vehicle door guard of claim 3, wherein said deployable guard panels are hingedly attached end-to-end and said guard panels are adapted to form a corrugated surface when in the extended position.

5. The vehicle door guard of claim 4, further comprising a control unit adapted to control the actuation of said motor such that said deployable guard panels transition between said extended and retracted positions.

6. The vehicle door guard of claim 5, wherein said control unit comprises a key fob, said key fob comprising a wireless transceiver adapted to transmit a signal to said motor.

7. The vehicle door guard of claim 5, wherein said control unit comprises a user interface disposed within a vehicle interior, said user interface comprising a transceiver adapted to transmit a signal to said motor.

8. The vehicle door guard of claim 1, wherein said base panel is a planar member.

9. The vehicle door guard of claim 8, wherein said deployable guard panels are hingedly attach to said base panel via support arms.

10. The vehicle door guard of claim 9, wherein said support arms are adapted to rest within complementary recesses disposed on said deployable guard panels when in the extended position such that said deployable guard panels rest flush against said vehicle door exterior surface.

11. The vehicle door guard of claim 10, further comprising a control unit adapted to control the actuation of said motor such that said deployable guard panels transition between said extended and retracted positions.

12. The vehicle door guard of claim 11, wherein said control unit comprises a key fob, said key fob comprising a wireless transceiver adapted to transmit a signal to said motor.

13. The vehicle door guard of claim 11, wherein said control unit comprises a user interface disposed within a vehicle interior, said user interface comprising a transceiver adapted to transmit a signal to said motor.

14. The vehicle door guard of claim 1, further comprising a control unit adapted to control the actuation of said motor such that said deployable guard panels transition between said extended and retracted positions.

15. The vehicle door guard of claim 14, wherein said control unit comprises a key fob, said key fob comprising a wireless transceiver adapted to transmit a signal to said motor.

16. The vehicle door guard of claim 14, wherein said control unit comprises a user interface disposed within a vehicle interior, said user interface comprising a transceiver adapted to transmit a signal to said motor.

17. A vehicle door having an integral, extendable door guard, comprising:
- a motor disposed within said vehicle door having an exterior surface, said motor comprising a drive shaft extending therefrom through said vehicle door exterior surface;
- a base panel connected to said drive shaft, wherein said base panel is adapted to be affixed to said vehicle door exterior surface;
- a plurality of deployable guard panels pivotally mounted to said base panel;
- wherein said motor is adapted to cause said plurality of deployable guard panels to transition between a vertically extended position and an overlying retracted position.

18. The vehicle door having an integral, extendable door guard of claim 17, further comprising a control unit adapted to control the actuation of said motor such that said deployable guard panels transition between said extended and retracted positions.

19. The vehicle door having an integral, extendable door guard of claim 17, wherein said base panel is a protruding member, said deployable guard panels are hingedly attached end-to-end, and said deployable guard panels are adapted to form a corrugated surface when in the extended position.

20. The vehicle door having an integral, extendable door guard of claim 17, wherein said base panel is a planar member, said deployable guard panels are hingedly attached to said base panel via support arms, and said support arms are adapted to rest within complementary recesses disposed on said deployable guard panels when in the extended position such that said deployable guard panels rest flush against said vehicle door exterior surface.

\* \* \* \* \*